United States Patent Office 3,150,983
Patented Sept. 29, 1964

3,150,983
PROCESS FOR THE PRODUCTION OF SEASONINGS FROM MUSHROOMS WITH CELLULASE PRODUCED BY MICROORGANISMS AND THE RESULTING PRODUCT
Yoshisato Oshikawa, Kumamotoshi, Japan, assignor to Meiji Seika Kaisha Ltd., and Kinki Yakult Seizo Kabushiki Kaisha, Chuo-ku, Japan, both corporations of Japan
No Drawing. Filed Apr. 16, 1962, Ser. No. 187,945
Claims priority, application Japan June 6, 1961
3 Claims. (Cl. 99—140)

The present invention relates to a process for the production of seasonings from mushrooms with cellulase produced by microorganisms.

It is commonly well known that mushrooms (Agaricacea) have, in general, proper aroma and taste. The sweet taste, for example, of Cortinellus shiitake is composed of guanylic acid and various amino acids and the aroma is chiefly matsutakeol. The mushrooms are utilized in great quantities in cooking. Raw mushrooms, however, are liable to easily deteriorate and putrefy by bacteria. Hitherto, the mushrooms must be refrigerated or frozen and packed canned, salted or dried in order to be preserved comparatively safely. These conventional means, however, would be accompanied by the defects of decrease of taste and nutrients as well as of unsatisfactory preservation.

The components of the mushrooms are different according to the kind thereof. For example the components of Cortinellus shiitake are composed of 3–4% ash, 5% crude fat, 15–20% crude protein, 7–8% crude fiber and 55–65 carbohydrate. In general, the carbohydrate of the mushrooms contains mannitol, trehalose and the like but mainly composed of hemicellulose of β-linkage. The mushrooms are hardly softened and minimized owing to the hemicellulose of β-linkage together with cellulose of β-linkage, these being indigestible.

According to the present invention a process for the treatment of mushrooms is provided which comprises softening or minimizing the body of the mushrooms by enzymically decomposing cellulose and hemicellulose with cellulase produced by cultivation of microorganisms to give a liquid, pasty or pulverized seasoning. According to the process of this invention a conventional steam treatment of mushrooms can be reduced and excess chemical and mechanical treatments may be eliminated. In addition thereto, by means of the simple treatment of the present invention the mushrooms may be readily worked and safely preserved without decrease of their nutrients, taste and aroma and deterioration thereof. Therefore, according to the present invention the utilization of mushrooms may be considerably simplified. The enzyme cellulase used in the present invention are produced by cultivation of micro-organisms such as Trichoderma, Myrothecia, Actinomycetes, Aspergilli and the like. The optimum pH of enzymic action of said cellulase is mostly on the weakly acid side (2.5–6.5) and the optimum temperature is mostly in the range of 20°–60° C.

The enzymic treatment of the mushrooms according to the present invention is carried out as follows. At first cellulase is produced by cultivation of cellulase-producing microorganisms in a usual solid or liquid culture medium. An extract or filtrate containing cellulase resulting from said culture medium is employed as it is or as an enzyme solution. Otherwise, an enzyme solution obtained by concentrating the enzyme-contents of said extract or filtrate, as required, by any conventional means employing ammonium sulfate, ethanol or acetone etc. may be used. Further, an enzyme solution obtained by dissolving the enzyme product, which is prepared by separating from aforesaid enzyme solution and refining, in water or inorganic salt solution in a proper concentration may also be utilized. In case the enzyme solution is employed said solution is adjusted to pH 2.5–6.5. In this enzyme solution raw or dried mushrooms are immersed, said mushrooms being in advance chopped or crushed after water washing and if desired slightly blanching. The enzyme solution containing mushrooms may be added, as required, with a small amount of antiseptic and kept at 20°–60° C. for 2–24 hrs. After softening of mushrooms, the mixture is subjected to the pressing or centrifugal separation to give a solution. The solution may be worked as it is or after seasoning into a pasty or pulverized product. For example, 24 g. of Cortinellus shiitake (dried mushroom) are immersed in water for 2 hrs. and then crushed in a mixer. The whole amount of the mixture is made 360 ml. with addition of m/10 citrate buffer solution (pH 5.0) to which 90 ml. of an enzyme solution (300 u./ml.) are added. After the enzymic action at 40° C. for 24 hrs. the product thus treated is filtered and insoluble matters are measured. The result is as follows:

Insoluble dried matter before enzymic action __g__ 5.622
Insoluble dried matter after enzymic action ___g__ 0.198
Rate of remaining _____Percent__ 3.5
Rate of decrease _____do____ 96.5

The present invention will be explained by way of examples as follows:

Example 1

1 kg. of bran is impregnated with 800 ml. of water and sterilized with steam at 100° C. for 30 minutes. After cooling to 30° C.; Trichoderma viride is inoculated and cultured at about 30° C. for 3 days. After completion of cultivation, 2.5 l. of water is added to 1 kg. of the bran malt to extract cellulase produced therein. To 2 l. of the extract 4 l. of acetone is added then cellulase deposited is recovered by filtration and air-dried. The dried cellulase is dissolved in distilled water to prepare 15% enzyme solution of cellulase potency 300 u./ml.

50 g. of Cortinellus shiitake (dried) is immersed in 500 ml. of water for 2 hours and subjected to a mixer to crush them. The mixture is added with 100 ml. of the enzyme solution and kept under the enzymic action at 40° C. for 10 hours. After completion of the enzymic action, the mixture is filtered. The filtrate is concentrated under reduced pressure to give 100 g. of paste.

Example 2

1 kg. of bran malt of Penicillium No. 927 prepared by the method as shown in Example 1 is treated in the same manner as in Example 1 to give an enzyme solution the cellulase potency of which is 400 u./ml.

100 g. of Agaricus campestris crushed in a mixer is added in 50 ml. of the enzyme solution and kept under the enzymic action at 40° C. for 8 hours. After completion of the enzymic action, the mixture is concentrated under reduced pressure to give 20 g. of paste.

I claim:

1. A process for the production of seasonings from mushrooms which comprises immersing the mushrooms in an enzyme solution containing microorganism produced cellulase at 20–60° C. for two to twenty-four hours and at a pH 2.5–6.5 to decompose cellulose and hemi-cellulose of the mushrooms and concentrating the substance thus enzymically treated to give a seasoning.

2. The process of claim 1, wherein the microorganism is selected from the group consisting of Trichoderma, Myrothecia, Actinomycetes, and Aspergilli.

3. The product produced according to the process of claim 1.

No references cited.